United States Patent [19]
Gehrmann

[11] Patent Number: 5,455,633
[45] Date of Patent: Oct. 3, 1995

[54] CHROMAKEY METHOD FOR PROCESSING PICTURE SIGNALS IN WHICH FADING OPERATIONS ARE PERFORMED IN PROPORTIONAL ZONES BASED ON A CONTROL SIGNAL

[75] Inventor: Rainer Gehrmann, Alsbach-Hähnlein, Germany

[73] Assignee: U.S. Philips Corporation, New York, N.Y.

[21] Appl. No.: 111,684

[22] Filed: Aug. 25, 1993

[30] Foreign Application Priority Data

Sep. 3, 1992 [DE] Germany .................. 42 29 377.4

[51] Int. Cl.$^6$ .................................................. H04J 9/75
[52] U.S. Cl. ........................ 348/587; 348/592; 348/597
[58] Field of Search .................................. 348/586, 587, 348/590, 591, 592, 593, 597; H04N 9/75

[56] References Cited

U.S. PATENT DOCUMENTS

| | | |
|---|---|---|
| 4,533,937 | 8/1985 | Yamamoto et al. . |
| 5,194,941 | 3/1993 | Grimaldie et al. .................. 348/592 X |
| 5,301,016 | 4/1994 | Gehrmann ........................ 348/586 |
| 5,335,174 | 10/1994 | Mishima ............................ 348/597 X |

FOREIGN PATENT DOCUMENTS

| | | |
|---|---|---|
| 4142650 | 6/1993 | Germany . |
| 4143180 | 7/1993 | Germany . |
| 2262860 | 6/1993 | United Kingdom . |
| 9105443 | 4/1991 | WIPO . |

*Primary Examiner*—Victor R. Kostak
*Assistant Examiner*—Nathan S. Flynn
*Attorney, Agent, or Firm*—Edward W. Goodman

[57] ABSTRACT

In a chroma-key method for inserting a background picture signal into key color-characterized key regions of a foreground picture signal, in which method fading operations are performed between the picture signals in proportional zones in dependence upon a control signal, while intermediate colors occurring in the proportional zones in the foreground signal are transformed into new intermediate colors which constitute a transition from the color of the foreground picture signal to that of the background signal, an optimal adaptation of the proportional zone to the respective color location of a foreground picture signal region is ensured in that individual proportional zones for regions of different color locations in the foreground picture signal are fixed in such a way that the distance between the color location of each region and the color location of the key color is determined individually for each region, and in that the control signal is generated for each region in dependence upon the color location distance determined for the respective region.

12 Claims, 3 Drawing Sheets

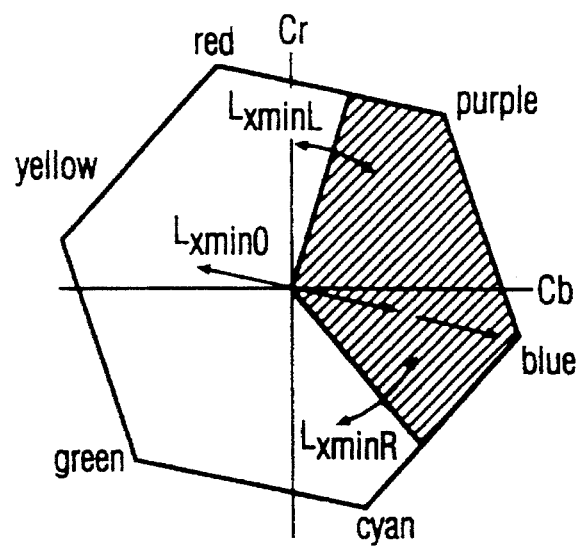
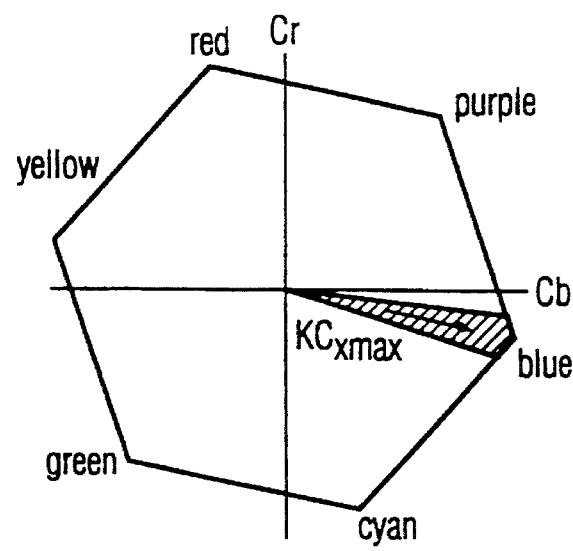
FIG. 3a         FIG. 3b
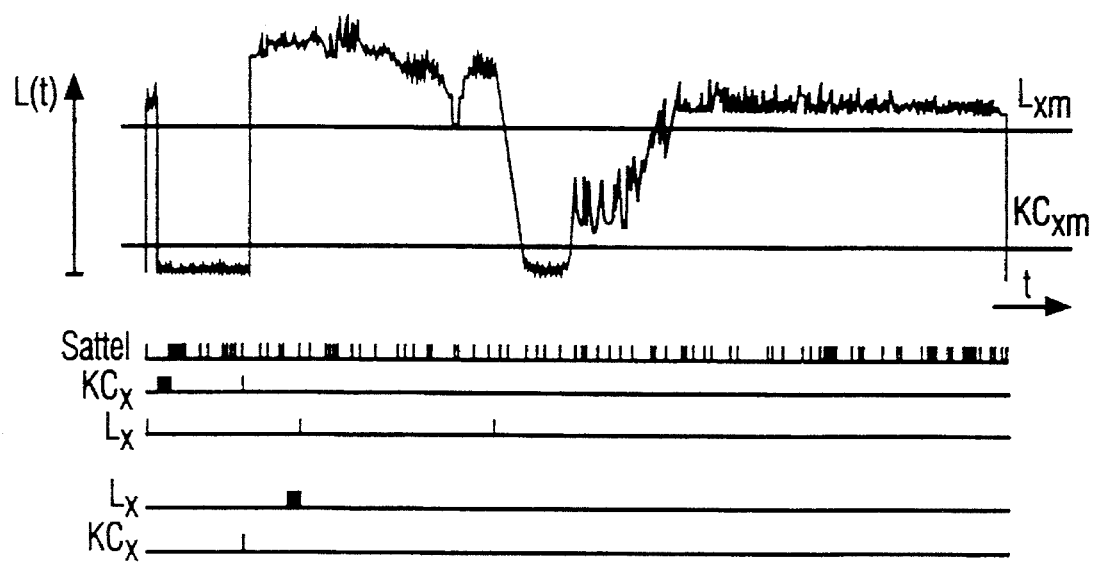
FIG. 4

CHROMAKEY METHOD FOR PROCESSING PICTURE SIGNALS IN WHICH FADING OPERATIONS ARE PERFORMED IN PROPORTIONAL ZONES BASED ON A CONTROL SIGNAL

BACKGROUND OF THE INVENTION

1. Field of the Invention

The invention relates to a chromakey method for inserting a background picture signal into key color-characterized key regions of a foreground picture signal, in which method fading operations are performed between the picture signals in proportional zones in dependence upon a control signal, while intermediate colors occurring in the proportional zones in the foreground signal are transformed into new intermediate colors which constitute a transition from the color of the foreground picture signal to that of the background signal.

2. Description of the Related Art

Such a chromakey method, in which there is a soft fading between the foreground picture signal and the background picture signal, and conversely, in a proportional zone, is proposed in the non-prepublished prior German Patent Application DE-A 41 42 650. At the transition of the actual picture contents and its colors to the key region and the color in that region, transition colors occur in the foreground picture signal, which transition colors become disturbingly manifest when there is an abrupt change-over from the foreground signal to the background signal. In accordance with the above-mentioned prior Patent Application, there should be a soft fading between the foreground picture signal and the background picture signal, while these transition colors should be transformed. In the transformation of the transition colors, an orientation with respect to the colors of the background picture signal-is realized so that the transition colors, no longer vary between the color of the foreground picture signal and the key color, but between the color of the foreground picture signal and the color of the background picture signal.

However, the problem of this method is that this proportional zone can only be fixed jointly for all foreground colors. Moreover, these colors may vary through several pictures/sub-pictures so that under circumstances, a proportional zone once fixed is no longer optimal. A correction could be performed by manually correcting the control signal which controls the fading in the proportional zone.

SUMMARY OF THE INVENTION

It is an object of the invention to further develop the method described in the opening paragraph in such a way that it can be better adjusted, both locally and with respect to time, to the data in the picture.

According to the invention, this object is solved in that individual proportional zones for regions of different color locations in the foreground picture signal are fixed in such a way that a distance between the color location of each region and a color location of the key color is determined individually for each region, and in that the control signal is generated for each region in dependence upon the color location distance determined for the respective region.

Thus, a suitable proportional zone is determined individually for each region of a given color location or color location range in the foreground picture signal. To this end, the distance between the color location of the foreground picture signal region and the color location of the key color is determined. In accordance with this distance, the proportional zone and hence the control signal controlling the transition in this zone can be adapted to this distance. The control signal is thus individually generated in dependence upon the fixed distance for each of these foreground picture signal regions. For color locations in the foreground picture signal, which are relatively fax remote from the color location of the key signal, a relatively wide proportional zone may be chosen by generating the control signal accordingly, whereas a short proportional zone may be chosen for regions whose color locations are relatively close to those of the key signal. Thus, the proportional zone is individually adapted to an optimal extent to the color location of the respective region.

An independent and very rapid adaptation to the picture data is realized. The length of the transformation range is adapted to the distance between the color location of the respective range of the foreground picture signal and the color location of the key signal. Consequently, color transitions from the foreground picture signal, which, with respect to their color location, are very close to the key signal, are also faded without any fringes, likewise as those whose color location is relatively fax remote from the color location of the key signal. During the fading operation, there is thus a natural color transition from the foreground picture signal to the background picture signal, and conversely, with the correct intermediate hues.

In accordance with an embodiment of the invention, the respective color location distance is determined for regions of different color locations in a picture line of the foreground picture signal, and the control signal for the proportional zones of the regions of said picture line is generated in dependence upon said distance, and in that the control signal is subsequently used in the buffered foreground picture signal for the fading operations in the proportional zones of said picture line.

The individual determination of the color locations for foreground picture signal regions may advantageously be effected line by line. Thus, in one picture line of the foreground picture signal, it is determined which regions of different color locations of the foreground picture signal are present and which respective color location distance is present between these regions and the color location of the key signal. The control signal for the proportional zones can be individually generated for the different regions of these picture lines. The control signal thus generated may subsequently be used for the corresponding fading operations and for the resultant transformation of the intermediate colors in that the foreground picture signal is delayed by one picture line so that the control signal for this delayed picture line is available at the correct time.

In accordance with a further embodiment of the invention, the control signal K is generated in accordance with the formula $$K = \frac{L_x - L}{L_x}$$

in which $L_x$ is the distance between the color location of a foreground picture signal region and the color location $KC_x$ of the key signal, and in which L is the distance between the color location in question of a transition color occurring in the proportional zone and the color location of the key color.

For the above-described regions of different color locations in the foreground picture signal, an individual value of $L_x$ is determined which represents the distance between the color location of the foreground picture signal region and the color location of the key signal. Transition colors occur in the foreground picture signal in the color location range between the color location of a foreground picture signal region and the color location of the key signal. In this range, different transition colors have different distances to the color location of the key color. The distance in question is designated by means of the value L. The formula given above yields a value K at a known value of $L_x$ and at the value L to be determined at the time in the transition range. This value K represents the control signal which indicates to which extent the fading operation from the foreground picture signal to the background picture signal, or conversely, is to be performed and which thus also controls the color transformation.

The extreme values are K=0, i.e. only the foreground picture signal is inserted, or K=1, i.e. only the background picture signal is inserted. In the transition range the value K of the control signal assumes values between 0 and 1 so that a soft fading and a transformation of the transition colors takes place. This transition range between the values 0 and 1 of the value K of the control signal represents the proportional zone. Values of K<0 or K>1 are not admissible and are limited to 0 or 1, respectively.

The transformation of the transition colors in the proportional zone may be performed in accordance with the formula $$OUT = FG + K \times (BG - KC)$$

in which FG is the current color of the foreground picture signal, BG is the current color of the background picture signal, and KC is the key color. All these signals may be present either as components R, G, B, or as luminance and color difference signals Y, $C_B$ and $C_R$. Dependent on the control signal, i.e. the value K, there is a transformation of the transition colors during the fading operation.

To ensure that the value K is always 0 for a region of a given color location or color location range, a further embodiment of the invention is characterized in that for small spreads in the color locations within a region, a minimum distance between said color locations and the color location of the key color is chosen for $L_x$. This ensures that, with small spreads of the color locations of a region always occurring, no part of this region is keyed out.

In a further embodiment of the invention, a value of $L_{xmin}$ is chosen for the foreground picture signal regions whose color location is proximate to the color location of the key signal, and in that $L_x$ is set at $L_{xmin}$ for computing the control signal for regions where $L_x < L_{xmin}$.

A value $L_{xmin}$ may be given which is always assumed for such regions as value $L_x$ whose color location is close to that of the key color and for which a value of $L_x$ is found which is smaller than $L_{xmin}$. The value $L_{xmin}$ may also be used to enforce a value K=0 of the control signal in arbitrary regions of the foreground picture signal.

In accordance with a further embodiment of the invention, the color locations KC are determined individually for different regions of the key signal. Also the color and thus the color location of the key signal may change to a small extent. By individually determining the color location, for example, for different regions within a picture line of the foreground picture signal, the proportional zone can be determined even more accurately, because the value K of the control signal is then determined in accordance with the above-given formula in dependence upon the actual color locations of the key signal. The determination of the distances required for the determination of the values of the control signal K then relate to the, actually present color location of the key signal, which, as stated, may have a small spread.

In accordance with the limit value $L_{xmin}$ for color locations of the foreground picture signal region, a limit value $KC_{xmax}$ may be provided for the smallspread color locations of the key color, which value, in a further embodiment of the invention, is chosen in such a way that a limit value $KC_{xmax}$ is chosen, below which value the color locations KC constantly track the changing color location of the key color.

In a further embodiment of the invention, the values $L_{xmin}$ and $KC_{xmax}$ can be chosen in dependence upon an angle in the color space for an even better adaptation to the different color locations occurring in the foreground picture signal.

A further embodiment of the invention is characterized in that in determining the color location distance between the foreground picture signal region and the key color region, an angle corresponding to this distance is also determined in the color space.

This determined angle may be used, for example, for correcting the angle deviations during the edge, which deviations are caused by gamma precorrection of a camera signal.

A further embodiment of the invention is characterized in that for determining the values of $L_x$ and possibly $KC_x$, the first and second derivatives of the function L(t), indicating the variation with respect to time of the distance between the color location of a pixel of the foreground picture signal and the color location of the key signal, are used for determining saddle points in the variation of the function L(t) in such a way that the first and second derivatives of L of T have the value of zero, while for edges in the transition between a color region of the foreground picture signal and a key color region, it holds that the last saddle point before falling below the value $L_{xmin}$ is the value $L_x$ of the color region of the foreground picture signal, and that the first saddle point after falling below the value $KC_{xmax}$ is the value $KC_x$ of the key color region, and for edges in the transition between a key color and a color region of the foreground picture signal, it holds that the last saddle before exceeding the value $KC_{xmax}$ is the value $KC_x$ of the key color region, and that the first saddle after exceeding the value $L_{xmin}$ is the value $L_x$ of the color region of the foreground picture signal, while it holds for all edges that the values of $L_x$ and $KC_x$ determined at the two relevant saddle points are only valid when there is no further saddle point between the two relevant saddle points.

For determining the respective value K of the control signal in accordance with the above-given formula, the value $L_x$ of a foreground picture signal region must be determined. If the color locations of the key signal are also determined individually, the value $KC_x$ of a region of the key area should also be determined. For determining these values, the curve analysis of the algebraic differential calculus can be advantageously utilized in that the first and the second derivative of the function L(t) are formed. This may be effected, for example, by subtraction of successive values.

The values $L_x$ and $KC_x$ substantially represent the values constituted by the base and the head, respectively, of an edge. In accordance with the algebraic curve analysis, these points represent saddle points in the variation of the function L(t). These saddle points are characterized in that the first and second derivative of the function L(t) have the value 0. Moreover, if the boundary condition is used, stating that only those individually determined values of $L_x$ are valid which are larger than $L_{xmin}$ and only those individually determined values of $KC_x$ are valid which are smaller than $KC_{xmax}$, the additional condition applies that these saddle points should be correspondingly arranged above or below the values $L_{xmin}$ and $KC_{xmax}$, respectively. The condition then holds that there should be no further saddle point between the two saddle points marking the start and the end of a transition edge, because this indicates that there is no smooth transition from or to the key color and that no appropriate $L_x$ can be determined. In this case the value $L_{xmin}$ is assumed for $L_x$ and the value $KC_{xmax}$ is fixed for $KC_x$.

The values K of the control signal and the distance and limit values required therefor can be relatively easily computed by means of signal processors. To this end a further embodiment of the invention is characterized in that an arrangement for performing the method according to the invention is provided which comprises a memory for delaying the picture signal by approximately one picture line, a digital signal processor with a memory for determining the values $L_{xmin}$, $KC_{xmax}$ and a mean value of the color locations KC of the key colors, and in that one or more further processors are provided for determining the individual values of $L_x$ and $KC_x$ which in their turn are used for determining the control signal K.

These and other aspects of the invention will be apparent from and elucidated with reference to the embodiments described hereinafter.

BRIEF DESCRIPTION OF THE DRAWINGS

In the drawings;

FIGS. 3a and 3b show an example for angle-dependent choice of the value $KC_{xmax}$;

FIG. 4 is a representation, similar to that in FIGS. 1a and 1b, of another picture content of the foreground picture signal.

DESCRIPTION OF THE PREFERRED EMBODIMENT

Figure 1A:
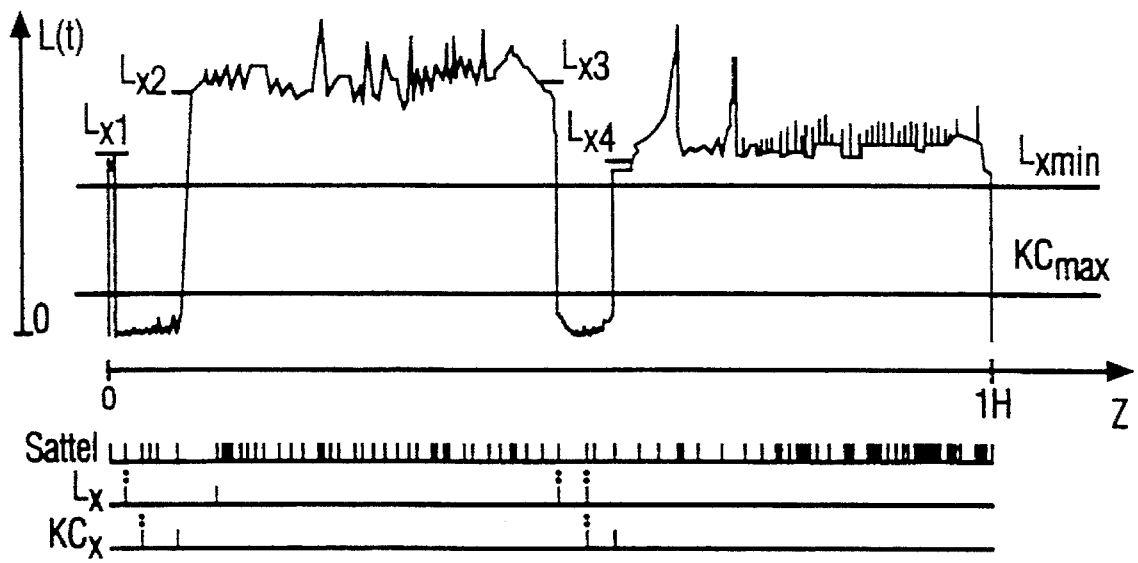
FIGS. 1a and 1b show, as a function of time, the signal L(t) and the values $L_x$ and $KC_x$ and their limit values $L_{xmin}$ and $KC_{xmin}$ for one picture line.
Figure 1B:
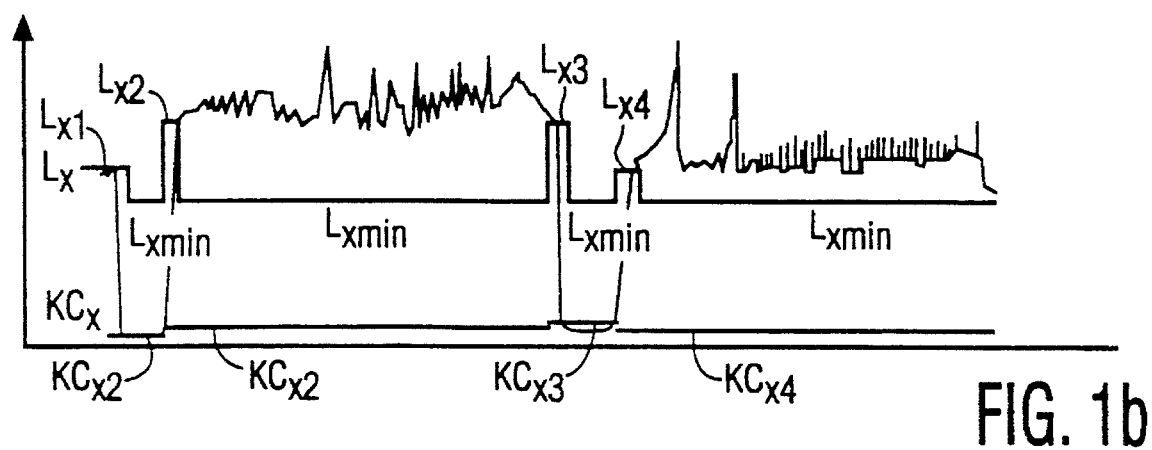

FIGS. 1a and 1b show the signal L(t) as a function of time for one picture line. The signal L(t) indicates the color location distance between the color location occurring in the foreground picture signal and the color location of the key color.

In accordance with the inventive method, the control signal and its value K should be determined in such a way that an optimal transition between the foreground picture signal and the background picture signal (not shown in the Figure) is achieved for the respective transition ranges and the transformation of the intermediate colors to be performed in these ranges. In FIGS. 1a and 1b, these transition ranges are those ranges in which a foreground picture signal region adjoins a key color region. These regions are characterized in that relatively steep edges occur in these regions in the function L(t). According to the invention, these edges are determined and the bases and heads of these edges are utilized for determining the values $L_x$ and $KC_x$.

Respective limit values, denoted by $L_{xmin}$ and $KC_{xmax}$, may be provided for the values $L_x$ to be individually determined for each region and, possibly for the values $KC_x$ to be individually determined for the key ranges. $L_{xmin}$ indicates the limit from which the individually determined values of $L_x$ are taken into account. If a region has a value $L_x$ which is smaller than the value $L_{xmin}$, the intermediate colors are transformed and the value $L_{xmin}$ is used for this region. The value $KC_{xmax}$ indicates an upper limit from which the occurring color locations are no longer considered to be associated with the spread of the key color.

A small region which is to be associated with a first color location distance $L_{x1}$ occurs at the start of a picture line shown in FIG. 1a. Subsequently, a region of the key color occurs. This is followed by a relatively large region of the foreground picture signal which has a color location distance $L_{x2}$ at the start and a color location distance $L_{x3}$ (similar to $L_{x2}$) at the end. A further region with a color location distance $L_{x4}$ follows after a short region of the key color.

To determine the values $L_x$ of the different regions, the algebraic curve analysis is used which allows the determination of the heads and bases of the respective transitions. FIG. 1a shows, below the picture line, the respective saddle points determined in the curve analysis. A saddle point is present whenever both the first and the second derivative of the signal L(t) are simultaneously zero.

At the transition between the first foreground picture signal region and the first key region in FIG. 1a, a saddle point occurs at the start of the edge and a saddle point occurs at the end of the edge. These two saddle points mark the value $L_{x1}$ of the foreground picture signal region and the value $KC_x$ of the key signal region. The condition holds that the first saddle point marking the value $L_{x1}$ of the foreground picture signal region is the last saddle point before falling below the value $L_{xmin}$, and that the value $KC_{x1}$ is the first saddle point after falling below the value $KC_{xmax}$. The boundary condition further holds that no further saddle point may occur between these two saddle points.

In a corresponding manner, it is determined for the subsequent rising edge representing a transition from the key signal region to another foreground picture signal region, that the last saddle point occurring before exceeding the value $KC_{xmax}$ marks the value $KC_{x2}$ of the key region, and that the next saddle point occurring after exceeding the value $L_{xmin}$ marks the value $L_{x2}$ of the foreground picture signal region.

In the further variation with respect to time in accordance with FIG. 1a, a transition occurs again between the region for which the value $L_{x2}$ was determined and a key region. The two corresponding saddle points are marked in the drawing. For the subsequent transition from the key region to another region for which the value $L_{x4}$ is determined, the corresponding saddle points are also marked. At this transition, for example, the value $L_{x1}$ is determined, which is marked by the first saddle point after exceeding the value $L_{xmin}$.

The control signal K can be determined with reference to the now known values of $L_{x1}$ to $L_{x2}$ and the several values $KC_x$ for the key regions during the period of the edge, in accordance with the formula $$K = \frac{L_x - L}{L_x}$$

In the ranges of the edges shown in FIG. 1a there is a fading to a background picture signal (not shown in FIGS.

1a and 1b) with reference to this control signal. In the proportional zones, a transformation of the occurring transition colors is performed in so far as the value $L_x$ of a foreground picture signal region is above the value $L_{xmin}$.

The same formula for determining the control signal K is used in the key color regions between a failing and a rising edge. $L_x$ is replaced by $L_{xmin}$ again so that for each relatively small $L_x$ of the key color region, a value of approximately 1 results for the value K of the control signal. In the foreground color regions between a rising and a falling edge, the substitution value $L_{xmin}$ in the same formula may also be used because a value K=1 of the control signal is to be secured in this case.

FIG. 1b shows the variation with respect to time of the values $L_x$ and $KC_x$ for the picture lines of FIG. 1a. FIG. 1b also shows at which instants the values $L_{x1}$ to $L_{x4}$ and $KC_{x1}$ to $KC_{x4}$ are determined and in which ranges they are valid. Moreover, the limit value $L_{xmin}$ is shown for the signal $L_x$.

Figure 2:
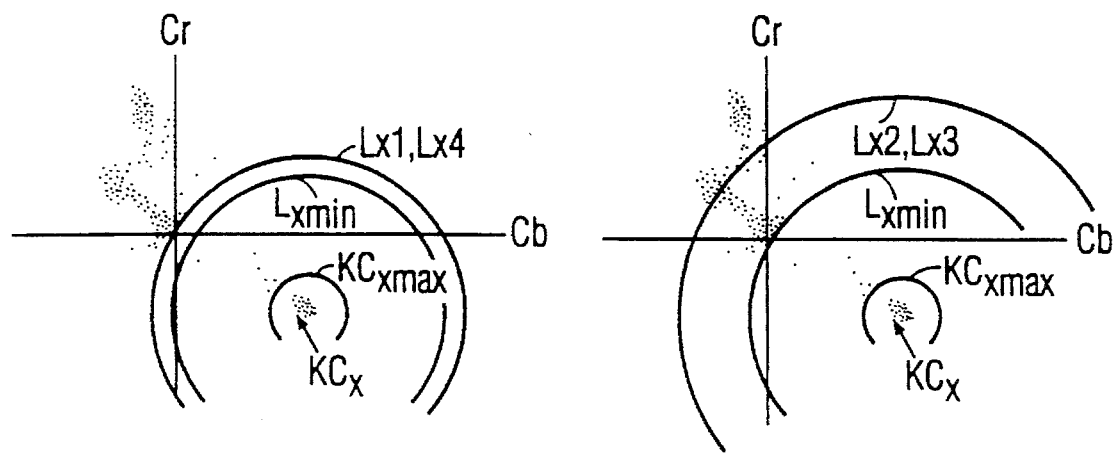
FIG. 2 shows the occurring color locations of the signal of FIGS. 1a and 1b.

FIG. 2 shows two graphs of the Cb/Cr color space. The two graphs show the color locations occurring during the picture line shown in FIGS. 1a and 1b. FIG. 2 shows that some accumulations of color locations occur. One color location accumulation corresponds to the first small region and the last large region of the representation according to FIGS. 1a and 1b. For these two regions, the color location distance $L_{x1}$ was determined, which, as is visible in FIG. 2, is larger than the limit value $L_{xmin}$.

For the first large region occurring in the picture line shown in FIGS. 1a and 1b, the value $L_{x2}$ was determined which represents the small spread of color locations of this region approximately in its low limit value. This is visible in the second representation according to FIG. 2.

In the two representations according to FIG. 2, the small spreads of color locations $KC_x$ of the key region are shown, as well as the limit value $KC_{xmax}$. The value L(t) of the representation according to FIGS. 1a and 1b, substantially represents the value of the distance constantly changing in the course of a picture line between the actually occurring color location and a nominal color location of the key region $KC_x$.

In the representation according to FIG. 2, the limit values $L_{xmin}$ and $KC_{xmax}$ are chosen in the form of circles. To adapt these limit values even better to different other color locations occurring in the foreground picture signal, it is advantageous to choose the two limit values in dependence upon the angle. This is shown in FIGS. 3a and 3b by way of example. FIG. 3a shows three different limits $L_{xminL}$, $L_{xminO}$ and $L_{xminR}$ and, for example, all these limits can be manually adjusted independently of each other.

In this way, a different fundamental selectivity may be created for different colors of the foreground picture signal. FIG. 3b shows that the corresponding limits for $KC_x$ can similarly be chosen in dependence upon the angle. The limit angles will generally be close together at $KC_x$ because the range of spread of the KC color locations normally extends essentially radially (saturation), which is conditioned by shadows forming on the color wall.

FIG. 4 shows the variation with respect to time of the function L(t) similar to FIGS. 1a and 1b, but for a different picture line with a different picture content. In FIG. 4 too, a small region initially occurs which is followed by a key color region. Subsequently, a foreground picture signal region with a relatively large value L(t) follows. This region is followed by a key color region again. For these mentioned regions, there are no particular problems when determining the values $L_x$ and $KC_{xmax}$; the determination is performed with reference to the saddle points in conformity with the picture line shown in FIGS. 1a and 1b. A saddle point representing the base of the next edge is present again at the end of the second key color region. However, after this saddle point, several further saddle points follow before the value $L_{xmin}$ is exceeded. This no longer satisfies the above-mentioned condition that the saddle points above $L_{xmin}$ and below $KC_{xmax}$ only mark a base and a head of an edge when no further saddle point occurs between the two saddle points. This condition is no longer fulfilled in the case of the second rising edge in FIG. 4 so that no value $L_x$ is determined for the relatively large region of this picture line. In this case the value $L_{xmin}$ is chosen for the value $L_x$, and a transformation of the intermediate colors, using $L_{xmin}$, is performed for the fading range between the background signal, which is used in the key color region, and the foreground signal.

Figure 5:
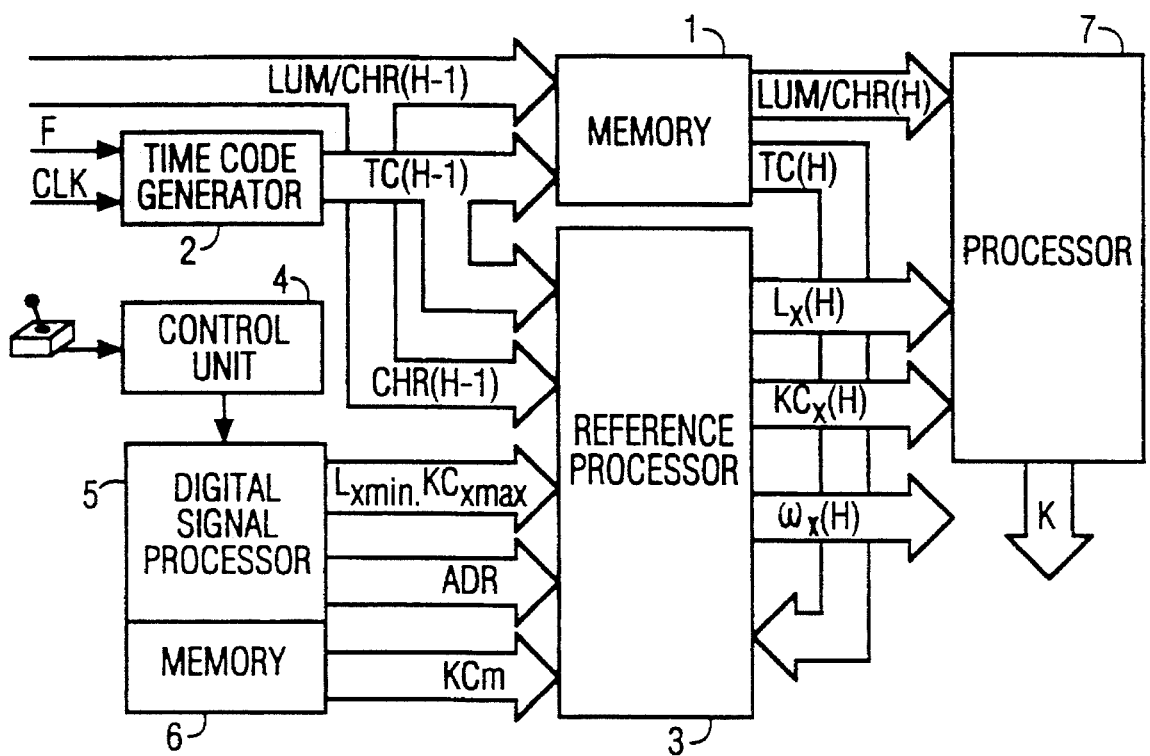
FIG. 5 shows a block diagram of an arrangement for performing the method.

FIG. 5 shows a block diagram of an arrangement for performing the method. The arrangement receives a luminance/chrominance signal LUM/CHR which is delayed in a memory 1 by one picture line period. A time code is generated in a time code generator 2 in addition to this signal LUM/CHR, which time code is also stored in the memory 1. Both the time code and the associated signal LUM/CHR are further applied to a reference processor 3.

The arrangement also includes a control unit 4 which controls a digital signal processor 5 which is connected to a memory 6. Particularly, the limit values $L_{xmin}$ and $KC_{xmax}$ can be predetermined by means of the control unit 4 and the digital signal processor 5. These values are also applied to the reference processor 3 which, with reference to these values, as well as to the chrominance signal CHR applied thereto, constantly computes the values L(t) and, with reference to these values, can compute the values L(x) and KC(x). These values are applied to a further processor 7 which computes the control signal K with reference to these values.

With reference to the control signal K and by means of a mixing device, which is not shown in FIG. 5, the foreground picture signal delayed by one picture line in the memory 1 can be faded to a background picture signal, which is not shown in FIG. 5, or, conversely, faded from the background picture signal to the foreground picture signal.

I claim:

1. A chroma-key method for inserting a background picture signal into key-color-characterized key regions of a foreground picture signal, and for fading between said background and foreground picture signals in proportional zones in dependence upon a control signal, said fading step comprising the steps:

fixing individual proportional zones for regions of different color locations in the foreground picture signal by determining a distance between a color location of each region and a color location of a key color individually for each region, and generating the control signal for each region in dependence upon the color location distance determined for the respective region; and transforming intermediate colors occurring in the proportional zones in the foreground signal into new intermediate colors which constitute a transition from the color of the foreground picture signal to that of the background signal using said control signal.

2. A method as claimed in claim 1, wherein in said step of fixing individual proportional zones, said determining a distance includes determining the respective color location distance for regions of different color locations in a picture line of the foreground picture signal, and said generating the control signal for each region includes generating the control signal for the proportional zones of the regions of said picture line in dependence upon said distance, whereby the control signal is subsequently used in a buffered foreground picture signal for the fading operations in the proportional zones of said picture line.

3. A method as claimed in claim 1, wherein in said fixing step, said generating the control signal includes generating the control signal in accordance with the formula:

$$K = \frac{L_x - L}{L_x}$$

in which K is the control signal, $L_x$ is the distance between the color location of a foreground picture signal region and the color location of a key color signal, and L is the distance between the color location in question of a transition color occurring in the proportional zone and the color location of the key color.

4. A method as claimed in claim 3, wherein in said fixing step, said generating the control signal further includes choosing a minimum distance between said color locations and the color location of the key color for $L_x$ for relatively small differences in the color locations within a region.

5. A method as claimed in claim 3, wherein in said fixing step, said generating the control signal further includes the steps of choosing a value of $L_{xmin}$ for the foreground picture signal regions whose color location is proximate to the color location of the key signal, and setting $L_x$ to $L_{xmin}$ for computing the control signal for regions where $L_x < L_{xmin}$.

6. A method as claimed in claim 1, wherein said zone fixing step includes determining color locations KC individually for different regions of the key color.

7. A method as claimed in claim 6, wherein said zone fixing step further includes choosing a limit value $KC_{xmax}$ below which value the color locations KC constantly track the changing color location of the key color.

8. A method as claimed in claim 5, wherein said zone fixing step further includes choosing a limit value $KC_{xmax}$ below which value the color locations KC constantly track the changing color location of the key color, and wherein the values $L_{xmin}$ and $KC_{xmax}$ are chosen in dependence upon an angle in the color space.

9. A method as claimed in claim 2, wherein said step of determining the color location distance between the foreground picture signal region and the key color region includes the step of determining an angle corresponding to this distance in the color space.

10. A method as claimed in claim 5, comprising the further steps:

obtaining first and second derivatives of a function L(t) indicating a variation with respect to time of the distance between the color location of a pixel of the foreground picture signal and the color location of the key signal to determine saddle points in the function L(t) in such a way that the first and second derivatives of L(t) have the value of zero; and deriving the value $L_x$ of the distance between the color location of a foreground picture signal region and the color location of the key signal from the fact that for edges in a transition between a color region of the foreground picture signal and a key color region, it holds that the last saddle point before falling below the value $L_{xmin}$ is the value $L_x$, and that for edges in the transition between a key color and a color region of the foreground picture signal, it holds that the first saddle after exceeding the value $L_{xmin}$ is the value $L_x$, while it holds for all edges that the values of $L_x$ determined at the two relevant saddle points is only valid when there is no further saddle point between the two relevant saddle points.

11. A method as claimed in claim 8, comprising the further steps:

obtaining first and second derivatives of a function L(t) indicating a variation with respect to time of the distance between the color location of a pixel of the foreground picture signal and the color location of the key signal to determine saddle points in the function L(t) in such a way that the first and second derivatives of L(t) have the value of zero; and deriving the value $KC_x$ of the key color region from the fact, for edges in the transition between a color region of the foreground picture signal and a key color region, it holds that the first saddle point after falling below the value $KC_{xmax}$ is the value $KC_x$, and for edges in the transition between a key color and a color region of the foreground picture signal, it holds that the last saddle before exceeding the value $KC_{xmax}$ is the value $KC_x$, while it holds for all edges that the value of $KC_x$ determined at the two relevant saddle points is only valid when there is no further saddle point between the two relevant saddle points.

12. A chroma-key arrangement for inserting a background picture signal into key-color-characterized key regions of a foreground picture signal, and for fading between said background and foreground picture signals in proportional zones in dependence upon a control signal, comprising:

means for transforming intermediate colors occurring in the proportional zones in the foreground signal into new intermediate colors which constitute a transition from the color of the foreground picture signal to that of the background signal, and for fixing individual proportional zones for regions of different color locations in the foreground picture signal by determining a distance $L_x$ between the color location of each foreground picture signal region and a color location of the key color individually for each region, choosing a value of $L_{xmin}$ for the foreground picture location of the key signal, and setting $L_x$ at $L_{xmin}$ for computing signal regions whose color location is proximate to the color the control signal for regions where $L_x < L_{xmin}$, determining color locations KC individually for different regions of the key color and choosing a limit value $KC_{xmax}$ below which value the color locations KC constantly track the changing color location of the key color, and generating the control signal K for each region in dependence upon the color location distance determined for the respective region in accordance with the formula $$K = \frac{L_x - L}{L_x}$$

in which $L_x$ is the distance between the color location in question of a transition color occurring in the proportional zone and the color location of the key color, wherein said transforming and fixing means includes:

an input for receiving a picture signal;

a memory coupled to said input for delaying the picture signal by approximately one picture line;

a first digital signal processor with a memory for determining the values $L_{xmin}$, $KC_{xmax}$ and a mean value of the color locations $KC$ of the key colors;

a second digital signal processor coupled to said input and to an output of said first signal processor for determining the individual values of $L_x$ and $KC_x$; and a third digital signal processor coupled to an output of said memory and said second digital signal processor for determining the control signal K.

* * * * *